US011542879B2

(12) United States Patent
Yamamoto et al.

(10) Patent No.: US 11,542,879 B2
(45) Date of Patent: Jan. 3, 2023

(54) EGR DEVICE

(71) Applicant: SUBARU CORPORATION, Tokyo (JP)

(72) Inventors: Kenichi Yamamoto, Tokyo (JP); Kenji Hijikata, Tokyo (JP); Masafumi Hanazawa, Tokyo (JP); Tomomichi Shiono, Tokyo (JP); Daisuke Kugo, Tokyo (JP); Noriyuki Matsuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/448,457

(22) Filed: Sep. 22, 2021

(65) Prior Publication Data
US 2022/0090550 A1 Mar. 24, 2022

(30) Foreign Application Priority Data
Sep. 24, 2020 (JP) .............................. JP2020-159971

(51) Int. Cl.
*F02D 41/00* (2006.01)
*F02M 26/52* (2016.01)
(Continued)

(52) U.S. Cl.
CPC ....... *F02D 41/0077* (2013.01); *F02D 41/005* (2013.01); *F02D 41/22* (2013.01);
(Continued)

(58) Field of Classification Search
CPC .... F02D 41/0077; F02D 41/005; F02D 41/22; F02D 41/123; F02D 41/221;
(Continued)

(56) References Cited

U.S. PATENT DOCUMENTS

2008/0148720 A1\* 6/2008 Tahara ................... F02B 37/22
60/295
2013/0145830 A1\* 6/2013 Kim ....................... F02M 26/49
73/114.74
(Continued)

FOREIGN PATENT DOCUMENTS

JP 2014-47718 A 3/2014

*Primary Examiner* — George C Jin
(74) *Attorney, Agent, or Firm* — Troutman Pepper Hamilton Sanders LLP

(57) ABSTRACT

An EGR device for a vehicle includes a valve driver, a pressure comparison unit, a freeze determination unit, and an EGR controller. The valve driver drives an EGR valve to open, when fuel cut has been continued for a predetermined time in a state where an engine speed of a vehicle's engine is equal to or higher than a predetermined rotational speed. The pressure comparison unit compares a pre-driving pressure of an engine's intake pipe with a post-driving pressure of the intake pipe. The freeze determination unit sets a flag indicating that the EGR valve is frozen when a difference between the pre-driving pressure and the post-driving pressure is less than a predetermined value and an external temperature is less than a threshold. When the flag has been set, the EGR controller sets a control state of the EGR valve to a closed state and stops EGR control.

3 Claims, 3 Drawing Sheets

(51) Int. Cl.
*F02D 41/22* (2006.01)
*F02M 26/49* (2016.01)
(52) U.S. Cl.
CPC ............ *F02M 26/49* (2016.02); *F02M 26/52* (2016.02); *F02D 2200/04* (2013.01); *F02D 2200/101* (2013.01)
(58) Field of Classification Search
CPC .......... F02D 2200/04; F02D 2200/101; F02D 2200/0414; F02D 2200/0406; F02M 26/49; F02M 26/52
See application file for complete search history.

(56) References Cited

U.S. PATENT DOCUMENTS

| | | | |
|---|---|---|---|
| 2013/0228228 A1* | 9/2013 | Akahane | F02M 26/47 137/59 |
| 2015/0040878 A1* | 2/2015 | Yoshioka | G01M 15/09 123/574 |
| 2018/0163643 A1* | 6/2018 | Kim | F02D 41/0055 |

* cited by examiner

EGR DEVICE

CROSS-REFERENCE TO RELATED APPLICATION

The present application claims priority from Japanese Patent Application No. 2020-159971 filed on Sep. 24, 2020, the entire contents of which are hereby incorporated by reference.

BACKGROUND

The disclosure relates to an EGR device.

Japanese Unexamined Patent Application Publication (JP-A) No. 2014-47718 discloses an EGR device provided with an opening degree sensor that detects an opening degree of an EGR valve.

SUMMARY

An aspect of the disclosure provides an EGR device to be applied to a vehicle. The EGR device includes a valve driver, a pressure comparison unit, a freeze determination unit, and an EGR controller. The valve driver is configured to drive an EGR valve to open, when fuel cut has been continued in a state where an engine speed of an engine of the vehicle is equal to or higher than a predetermined rotational speed for a predetermined time. The pressure comparison unit is configured to compare a pre-driving pressure of an intake pipe of the engine before the EGR valve is driven with a post-driving pressure of the intake pipe after the EGR valve has been driven. The freeze determination unit is configured to set a determination flag indicating that the EGR valve is frozen when a difference between the pre-driving pressure and the post-driving pressure is less than a predetermined value and an external temperature is less than a threshold. When the determination flag has been set, the EGR controller is configured to set a control state of the EGR valve to a closed state and stop EGR control.

An aspect of the disclosure provides an EGR device to be applied to a vehicle. The EGR device includes circuitry. The circuitry is configured to drive an EGR valve to open, when fuel cut has been continued in a state where an engine speed of an engine of the vehicle is equal to or higher than a predetermined rotational speed for a predetermined time. The circuitry is configured to compare a pre-driving pressure of an intake pipe of the engine before the EGR valve is driven with a post-driving pressure of the intake pipe after the EGR valve has been driven. The circuitry is configured to set a determination flag indicating that the EGR valve is frozen when a difference between the pre-driving pressure and the post-driving pressure is less than a predetermined value and an external temperature is less than a threshold. When the determination flag has been set, the circuitry is configured to set a control state of the EGR valve to a closed state and stop EGR control.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When a vehicle on which the EGR device is mounted travels under a low temperature environment below the freezing point, the EGR valve is frozen in some cases. Herein, in JP-A No. 2014-47718, the opening degree sensor is provided in the EGR device, so that when the EGR valve is frozen, the ECU can detect the EGR valve being frozen from an output from the opening degree sensor. However, when no opening degree sensor is provided in the EGR device, the ECU cannot accurately grasp the opening degree of the EGR valve, and misidentifies the opening degree of the EGR valve when the EGR valve has frozen in some cases. When the opening degree of the EGR valve is misidentified, the ECU performs control so as to advance ignition timing of an engine in some cases, so that knock may occur.

It is desirable to provide an EGR device capable of preventing an occurrence of knock.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
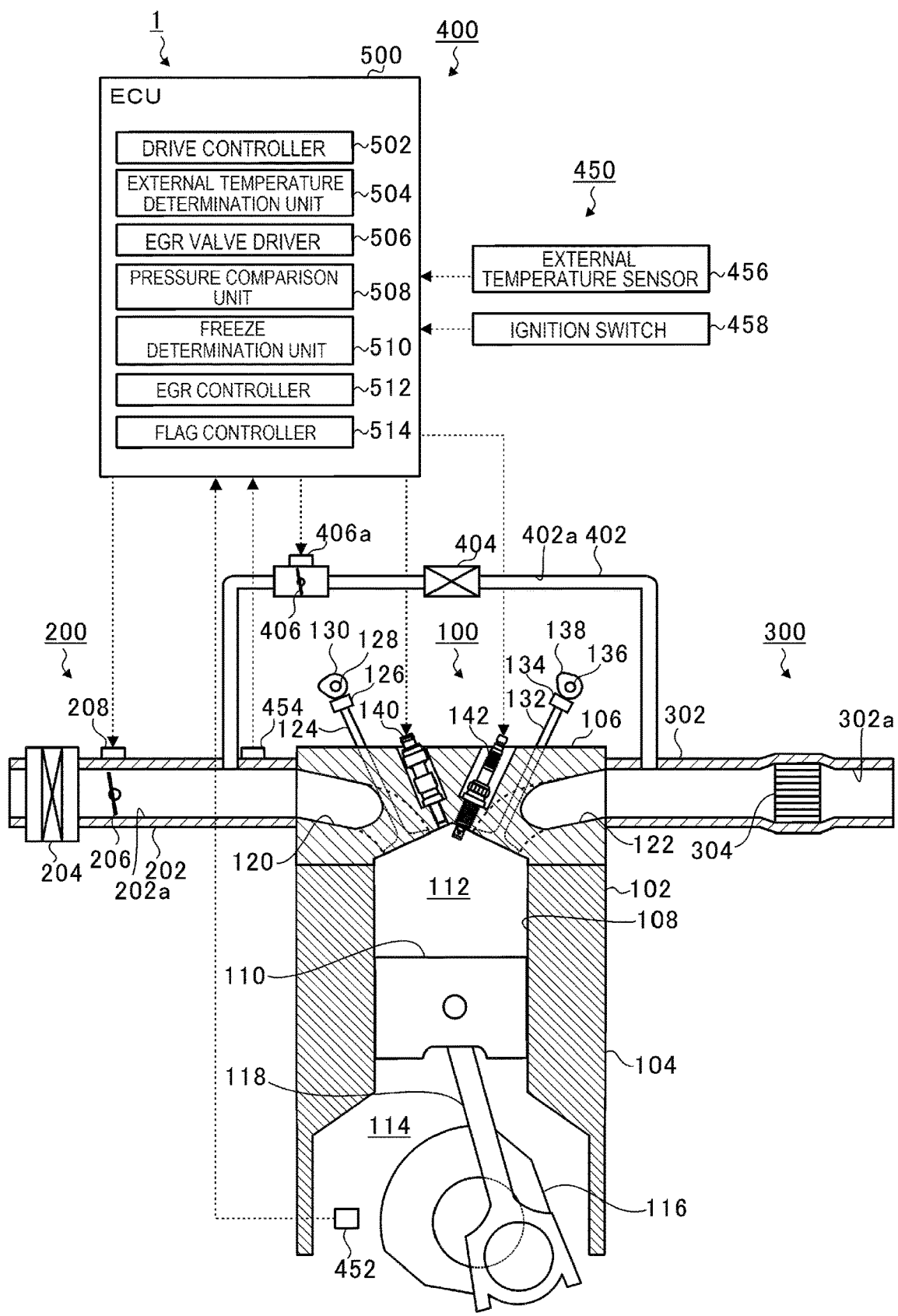
FIG. 1 is a schematic view illustrating a configuration of an engine system.

FIG. 1 is a schematic view illustrating a configuration of an engine system 1. The engine system 1 is mounted on a vehicle, for example. The configuration and processing related to the embodiment will be described in detail below, but the description of the configuration and processing unrelated to the embodiment will be omitted.

As illustrated in FIG. 1, the engine system 1 includes an engine 100, an inlet system 200, an exhaust system 300, and an EGR device 400. The engine 100 is a four-stroke engine in which an inlet stroke, a compression stroke, a combustion stroke, and an exhaust stroke are repeatedly performed as one cycle. The engine 100 includes a cylinder block 102, a crankcase 104, and a cylinder head 106.

In the cylinder block 102, a plurality of cylinders 108 are formed. In the cylinder 108, a piston 110 is slidably disposed. A space surrounded by the cylinder head 106, the cylinder 108, and a crown surface of the piston 110 is formed as a combustion chamber 112. In the piston 110, a gasket, a piston ring, and an oil ring are provided.

The crankcase 104 is permanently affixed to the cylinder block 102. Further, the crankcase 104 may be separately formed from the cylinder block 102. In an inside of the crankcase 104, a crank chamber 114 is formed, and in the crank chamber 114, a crankshaft 116 is rotatably supported. A connecting rod 118 is coupled to the crankshaft 116, and the piston 110 is coupled to the connecting rod 118.

The cylinder head 106 is provided at an opposite side of the crankcase 104 in the cylinder block 102, and is coupled to the cylinder block 102. An intake port 120 and an exhaust port 122 are formed in the cylinder head 106. The intake port 120 and the exhaust port 122 communicate with the combustion chamber 112.

A tip (head) of an intake valve 124 is positioned between the intake port 120 and the combustion chamber 112. A cam 130 fixed to an intake camshaft 128 abuts against an end of the intake valve 124 via a rocker arm 126. The intake valve 124 opens and closes the intake port 120 as the intake camshaft 128 rotates.

A tip (head) of an exhaust valve 132 is positioned between the exhaust port 122 and the combustion chamber 112. A cam 138 fixed to an exhaust camshaft 136 abuts against an end of the exhaust valve 132 via a rocker arm 134. The exhaust valve 132 opens and closes the exhaust port 122 as the exhaust camshaft 136 rotates.

An injector 140 and an ignition plug 142 are provided in the cylinder head 106. Tips of the injector 140 and the ignition plug 142 are disposed inside the combustion chamber 112. The injector 140 injects fuel toward the air that has flown into the combustion chamber 112 through the intake port 120. The ignition plug 142 ignites and combusts an air-fuel mixture of air and fuel at a predetermined timing. With such combustion, the piston 110 reciprocates in the cylinder 108, and a reciprocating motion of the piston 110 is converted into a rotational motion of the crankshaft 116 through the connecting rod 118.

The inlet system 200 includes an intake pipe 202, an air cleaner 204, and a throttle valve 206. The intake pipe 202 is formed in a cylindrical shape. An intake passage 202a is formed in an inside of the intake pipe 202. The intake pipe 202 is coupled to the cylinder head 106, and the intake passage 202a communicates with the intake port 120.

The air cleaner 204 is provided in an end portion at a side separated from the intake port 120 in the intake pipe 202, and removes a foreign matter to be mixed into the air sucked from the outside. The throttle valve 206 is driven to be opened and closed by an actuator 208 depending on a depression amount (hereinafter, also referred to as an accelerator opening degree) of an accelerator pedal (which is not illustrated), and adjusts an air amount to be sent to the combustion chamber 112.

The exhaust system 300 includes an exhaust pipe 302 and a catalyst 304. The exhaust pipe 302 is formed in a cylindrical shape. An exhaust passage 302a is formed in an inside of the exhaust pipe 302. The exhaust pipe 302 is coupled to the cylinder head 106, and the exhaust passage 302a communicates with the exhaust port 122.

The catalyst 304 is provided in the inside of the exhaust pipe 302. The catalyst 304 is, for example, a three-way catalyst, and contains platinum (Pt), palladium (Pd), and rhodium (Rh). The catalyst 304 removes hydrocarbon (HC), carbon monoxide (CO), nitrogen oxide (NOx) in exhaust gas discharged from the combustion chamber 112.

The EGR device 400 includes an EGR pipe 402, an EGR cooler 404, an EGR valve 406, a various sensor 450, and an ECU 500. The EGR device 400 recirculates part of the exhaust gas (hereinafter, referred to as EGR gas) from the exhaust passage 302a to the intake passage 202a through the EGR pipe 402.

The EGR pipe 402 includes one end, which is coupled to the exhaust pipe 302, and the other end, which is coupled to the intake pipe 202. In one example, one end of the EGR pipe 402 is coupled to the exhaust pipe 302 between the exhaust port 122 and the catalyst 304. The other end of the EGR pipe 402 is coupled to the intake pipe 202 between the intake port 120 and the throttle valve 206. The EGR pipe 402 is formed in a cylindrical shape. An EGR passage 402a is formed in an inside of the EGR pipe 402. The EGR passage 402a communicates between the exhaust passage 302a and the intake passage 202a. Hereinafter, in the EGR passage 402a, a side of the exhaust passage 302a is called an upstream side, and a side of the intake passage 202a is called a downstream side.

The EGR cooler 404 is provided in the EGR pipe 402. The EGR cooler 404 lowers the temperature of EGR gas circulating through the EGR passage 402a. The EGR valve 406 is provided at the downstream side from the EGR cooler 404 in the EGR pipe 402. The EGR valve 406 adjusts the flow rate of the EGR gas circulating through the EGR passage 402a. The EGR valve 406 is, for example, a butterfly valve, and an opening degree thereof is varied by a stepping motor 406a. Note that, no opening degree sensor that detects the opening degree of the EGR valve 406 is provided in the EGR valve 406 in the present embodiment.

The various sensor 450 includes a crank angle sensor 452, a pressure sensor 454, an external temperature sensor 456, and an ignition switch 458. The crank angle sensor 452 detects a rotation angle of the crankshaft 116, and outputs a detection signal to the ECU 500. The pressure sensor 454 detects a pressure in the inside of the intake pipe 202, and outputs a detection signal to the ECU 500. Herein, the pressure sensor 454 is provided in the intake pipe 202 between the intake port 120 and the throttle valve 206. Accordingly, the pressure sensor 454 detects an internal pressure in the intake pipe 202 at the side of the intake port 120 rather than the throttle valve 206. The external temperature sensor 456 detects an external temperature, and outputs a detection signal to the ECU 500. A switching operation between an OFF state and an ON state of the ignition switch 458 is made by an occupant of the vehicle. The ignition switch 458 outputs a detection signal indicating the OFF state and the ON state to the ECU 500.

The ECU 500 is a microcomputer including a CPU, a ROM in which programs and the like are stored, a RAM serving as a work area, and the like, and totally controls the engine system 1. The ECU 500 is electrically coupled to the injector 140, the ignition plug 142, the actuator 208, the stepping motor 406a, and the various sensor 450. In the present embodiment, when controlling the engine system 1, the ECU 500 serves as a drive controller 502, an external temperature determination unit 504, an EGR valve driver 506, a pressure comparison unit 508, a freeze determination unit 510, an EGR controller 512, and a flag controller 514.

The drive controller 502 derives an engine speed based on the detection signal output from the crank angle sensor 452. The drive controller 502 derives a target torque and a target engine speed with reference to a rotational speed torque map stored in advance in the ROM based on the derived engine speed, and an accelerator opening degree detected by an accelerator opening degree sensor (which is not illustrated). In the rotational speed torque map, for example, the relationship between the three factors, that is, the engine speed, the accelerator opening degree, and the target torque and the target engine speed is defined.

Further, the drive controller 502 determines a target air amount to be supplied to each cylinder 108 based on the target engine speed and the target torque, which have been derived, and determines a target throttle opening degree based on the determined target air amount.

Then, the drive controller 502 drives the actuator 208 so that the throttle valve 206 is opened by the determined target throttle opening degree.

Moreover, the drive controller 502 determines, based on the determined target air amount, for example, a fuel amount with a theoretical air-fuel ratio ($\lambda=1$), as a target injection amount. The drive controller 502 determines a target injection timing and target injection period of the injector 140 so as to inject the determined target injection amount of fuel from the injector 140. Then, the drive controller 502 drives the injector 140 at the determined target injection timing and during the determined target injection period to inject the target injection amount of fuel from the injector 140.

Moreover, the drive controller 502 determines target ignition timing of the ignition plug 142 based on the derived target engine speed and the detection signal output from the crank angle sensor 452. Then, the drive controller 502 ignites the ignition plug 142 at the determined target ignition timing.

The external temperature determination unit 504 derives an external temperature based on the detection signal output from the external temperature sensor 456. Moreover, the external temperature determination unit 504 determines whether the derived external temperature is less than a threshold (for example, 0° C.).

The EGR valve driver 506 drives the EGR valve 406 to open and close via the stepping motor 406a. The EGR valve driver 506 controls the number of drive steps using a fully closed state in which the EGR valve 406 is closed as a reference to control the opening degree of the EGR valve 406.

The pressure comparison unit 508 derives a pressure inside the intake pipe 202 based on the detection signal output from the pressure sensor 454. The pressure comparison unit 508 derives, for example, a pre-driving pressure before the EGR valve 406 is driven to be opened from the closed state in which the EGR valve 406 is closed. The pressure comparison unit 508 derives, for example, a post-driving pressure after the EGR valve 406 has been driven to be opened from the closed state in which the EGR valve 406 is closed. The pressure comparison unit 508 compares the pre-driving pressure with the post-driving pressure.

The freeze determination unit 510 determines whether the EGR valve 406 is frozen based on the pre-driving pressure, the post-driving pressure, and the external temperature. If determining that the EGR valve 406 is frozen, the freeze determination unit 510 set a determination flag indicating that the EGR valve 406 is frozen. If determining that the EGR valve 406 is not frozen, the freeze determination unit 510 turn off the determination flag.

If the determination flag is set, the EGR controller 512 sets the control state of the EGR valve 406 to the closed state, and stops the EGR control. If the determination flag is turned off, the EGR controller 512 starts the EGR control, and controls opening and closing of the EGR valve 406 in accordance with a driving state of the vehicle.

If the freeze determination unit 510 turns off the determination flag, the flag controller 514 sets a completion flag indicating that the EGR freeze determination has been completed. If the external temperature becomes less than the threshold in the state where the completion flag is set, the flag controller 514 turns off the completion flag.

The EGR controller 512 generally controls opening and closing of the EGR valve 406 in accordance with the driving state of the vehicle. When the EGR valve 406 is controlled to an opened state, the EGR gas is introduced into the combustion chamber 112 through the intake passage 202a and the intake port 120. The EGR gas is introduced into the combustion chamber 112 to lower the oxygen concentration and lower the combustion temperature in the combustion chamber 112. Accordingly, when the EGR controller 512 performs EGR control, an effect of reducing NOx included in the exhaust gas and an effect of increasing the fuel economy are obtained.

When the engine 100 is at a low load, the drive controller 502 determines that the target throttle opening degree is made to smaller, for example. As the target throttle opening degree is made to smaller, the internal pressure at the side of the intake port 120 likely to be a negative pressure by the throttle valve 206 of the intake pipe 202. When the pressure in the intake pipe 202 becomes the negative pressure, the piston 110 in the cylinder 108 is difficult to move in a direction to enlarge the combustion chamber 112. Accordingly, when the pressure in the intake pipe 202 is a negative pressure, energy to be used to drive the piston 110 is larger than that when the pressure in the intake pipe 202 is a positive pressure. As the energy to be used to drive the piston 110 becomes larger, the fuel economy becomes worse.

For example, when the engine 100 is at a low load, the EGR controller 512 starts the EGR control, and the EGR valve driver 506 drives the EGR valve 406 to open. When the EGR valve 406 is in the opened state, the EGR gas recirculates from the exhaust passage 302a to the intake passage 202a through the EGR passage 402a.

When the EGR gas flows into the intake passage 202a, the pressure in the intake pipe 202 rises. The pressure in the intake pipe 202 rises to reduce the energy to be used to drive the piston 110, and improve the fuel economy.

Meanwhile, when the vehicle on which the EGR device 400 is mounted travels under a low temperature environment below the freezing point, the EGR valve 406 is frozen in some cases. When no opening degree sensor is provided in the EGR device 400, the EGR controller 512 does not accurately grasp the opening degree of the EGR valve 406, and misidentifies the opening degree of the EGR valve 406 in some cases.

Generally, when the EGR valve 406 is controlled to the opened state, the EGR gas is introduced into the combustion chamber 112 to lower the oxygen concentration in the combustion chamber 112, and lower the combustion temperature in the combustion chamber 112. Accordingly, when the EGR valve 406 is controlled to the opened state, the drive controller 502 performs correction of advancing the ignition timing to the advance side. However, when the EGR valve 406 is frozen in the closed state, and the opening degree of the EGR valve 406 is misidentified, regardless that the EGR valve 406 is not actually opened, the drive controller 502 advances the ignition timing to the advance side in some cases. In that case, the EGR gas is not introduced into the combustion chamber 112, and the ignition timing is advanced regardless that the combustion temperature in the combustion chamber 112 becomes high, so that knock may occur due to over-advancing.

Therefore, the EGR device 400 in the present embodiment determines whether the EGR valve 406 is frozen, and performs a process of stopping the EGR control if it is determined that the EGR valve 406 is frozen. Hereinafter, the EGR freeze determination process in the present embodiment will be described in details.

Figure 2:
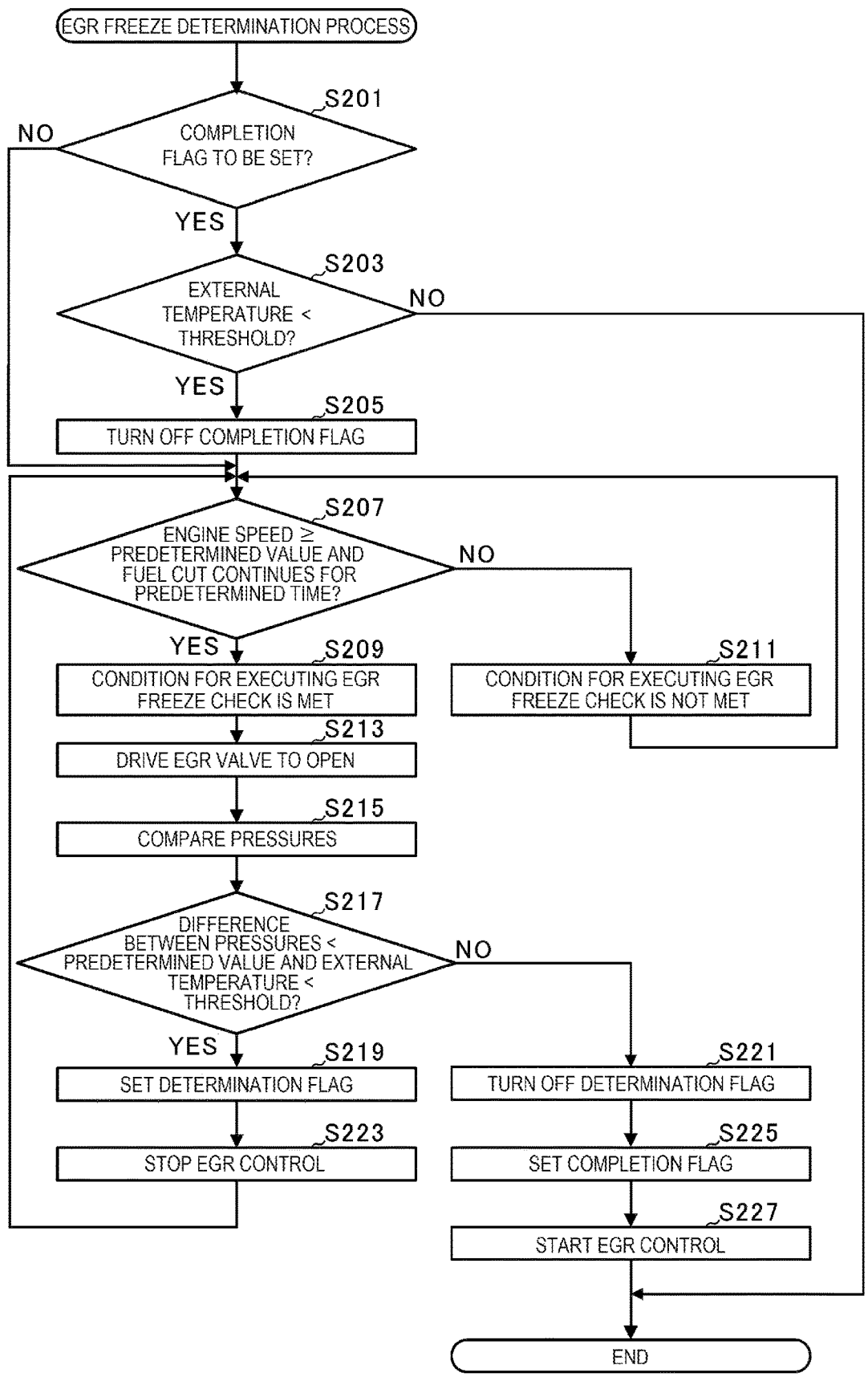
FIG. 2 is a flowchart illustrating an EGR freeze determination process according to an embodiment.

FIG. 2 is a flowchart illustrating an EGR freeze determination process according to an embodiment. As illustrated in FIG. 2, firstly, the EGR controller 512 determines whether a completion flag indicating that the EGR freeze determination has been completed, which will be described later in details, is set (S201). The completion flag is a flag that is set if it is determined that the EGR valve 406 is not frozen. That is, if the completion flag is set, it has been determined that the EGR valve 406 is not frozen. If the completion flag is not set, the EGR controller 512 proceeds to a process at S207, which will be described later.

If the completion flag is set, the external temperature determination unit 504 determines whether an external temperature is less than a threshold (for example, 0° C.) (S203). If the external temperature is equal to or higher than the threshold, the external temperature determination unit 504 ends the EGR freeze determination process. On the other hand, if the external temperature is less than the threshold, there is a possibility that the EGR valve 406 is frozen. Thus, the flag controller 514 turns off the completion flag (S205). That is, the flag controller 514 clears the completion flag. Herein, even when the completion flag has been set as a result of the freeze determination, which will be described later, if there arises a possibility that the EGR valve 406 is frozen due to the lowering of the external temperature, the freeze determination is executed again to steadily perform the freeze determination. The flag controller 514 turns off the completion flag, and then proceeds to a process at S207.

The EGR controller 512 determines whether the engine speed is a predetermined rotational speed or higher (for example, 1200 rpm or higher), and fuel cut has continued for a predetermined time (for example, 5 seconds) (S207). If the engine speed is the predetermined rotational speed or higher and the fuel cut has continued for a predetermined time, the EGR controller 512 determines that a condition for executing an EGR freeze check is met (S209). In a state where the engine speed is the predetermined rotational speed or higher and the fuel cut has continued for a predetermined time, the internal pressure of the intake pipe 202 is stable, and the EGR valve 406 is forcedly driven during this period to hardly affect a behavior of the engine 100. That is, herein, the EGR controller 512 determines a period during which the behavior of the engine 100 is hardly affected. On the other hand, if the engine speed is less than the predetermined rotational speed or the fuel cut has not continued for a predetermined time, the EGR controller 512 determines that the condition for executing the EGR freeze check is not met (S211), executes again the determination process at S207, and conducts the EGR freeze check.

If the condition for executing the EGR freeze check is met, the EGR valve driver 506 drives the EGR valve 406 to open for a certain period of time to an open side (S213). The EGR valve 406 is driven to be opened to cause an EGR gas to flow into the intake passage 202a from the exhaust passage 302a. Accordingly, when the EGR valve 406 normally operates, the pressure in the intake pipe 202 rises. On the other hand, when the EGR valve 406 is frozen and does not operate, the EGR gas does not flow into the intake passage 202a, and the pressure in the intake pipe 202 hardly changes. The pressure comparison unit 508 compares a pre-driving pressure before the EGR valve 406 is driven to be opened with a post-driving pressure after the EGR valve 406 has been driven to be opened (S215).

The freeze determination unit 510 determines whether a difference between the pre-driving pressure and the post-driving pressure is less than a predetermined value and the external temperature is less than a threshold (S217). Herein, the predetermined value is a difference value between the pre-driving pressure and the post-driving pressure, at which the EGR valve 406 is assumed to be frozen based on an experiment, and the threshold is, for example, 0° C., which are stored in advance in the ROM. If the difference between the pre-driving pressure and the post-driving pressure is less than the predetermined value and the external temperature is less than the threshold, the freeze determination unit 510 determines that the EGR valve 406 is frozen and sets the determination flag (S219). That is, if the external temperature is, for example, less than 0° C., it can be determined that the EGR valve 406 may be frozen. When the EGR valve 406 is frozen, the pressure in the intake pipe 202 does not vary due to the EGR valve 406 being driven to be opened, so that it can be determined that the EGR valve 406 is frozen based on the difference between the pre-driving pressure and the post-driving pressure. On the other hand, if the difference between the pre-driving pressure and the post-driving pressure is equal to or greater than the predetermined value or the external temperature is equal to or higher than the threshold, the EGR controller 512 turns off the determination flag (S221).

During a period in which the determination flag is on, the EGR controller 512 sets the control state of the EGR valve 406 to the closed state because abnormality occurs in the EGR valve 406, and stops the EGR control (S223). The EGR controller 512 stops the EGR control, so that the drive controller 502 performs drive control of the engine 100 by regarding the EGR valve 406 as being in the closed state, and knock due to over-advancing based on the misidentification of the opening degree of the EGR valve 406 can be prevented. On the other hand, when the determination flag has been turned off, the EGR controller 512 sets the completion flag (S225), starts the EGR control, and controls opening and closing of the EGR valve 406 in accordance with a driving state of the vehicle such as an engine load (S227).

During a period in which the determination flag is on, after stopping the EGR control, the EGR controller 512 again executes the determination process at S207, and executes again the processes at S213, S215, and S217 if the condition for executing the EGR freeze check is met. This can accelerate a recovery from the EGR control stop state by the EGR freeze determination as much as possible, and can attain the improvement in the fuel economy by the EGR control.

If the determination flag has been turned off, the flag controller 514 set the completion flag indicating that the EGR freeze determination has been completed because the EGR valve 406 is not frozen but is normal (S225), and ends the EGR freeze determination process. During a period in which the completion flag is on, the above-mentioned processes at S207, S213, S215, and S217 are not executed, and the forced opening drive for the freeze determination of the EGR valve 406 is not executed. That is, when the completion flag is set, the EGR valve driver 506 stops forcedly driving the EGR valve 406 for the freeze determination. Accordingly, an influence to the behavior of the engine 100 due to the forced opening drive of the EGR valve 406 can be reduced. Note that, the flag controller 514 sets the completion flag also when the freeze determination unit 510 changes the determination flag from on to off.

As in the forgoing, according to the present embodiment, the freeze determination unit 510 determines whether the EGR valve 406 is frozen. The EGR controller 512 stops the EGR control when it has been determined that the EGR valve 406 is frozen. This can prevent the occurrence of knock due to the misidentification of the opening degree of the EGR valve 406.

Figure 3:
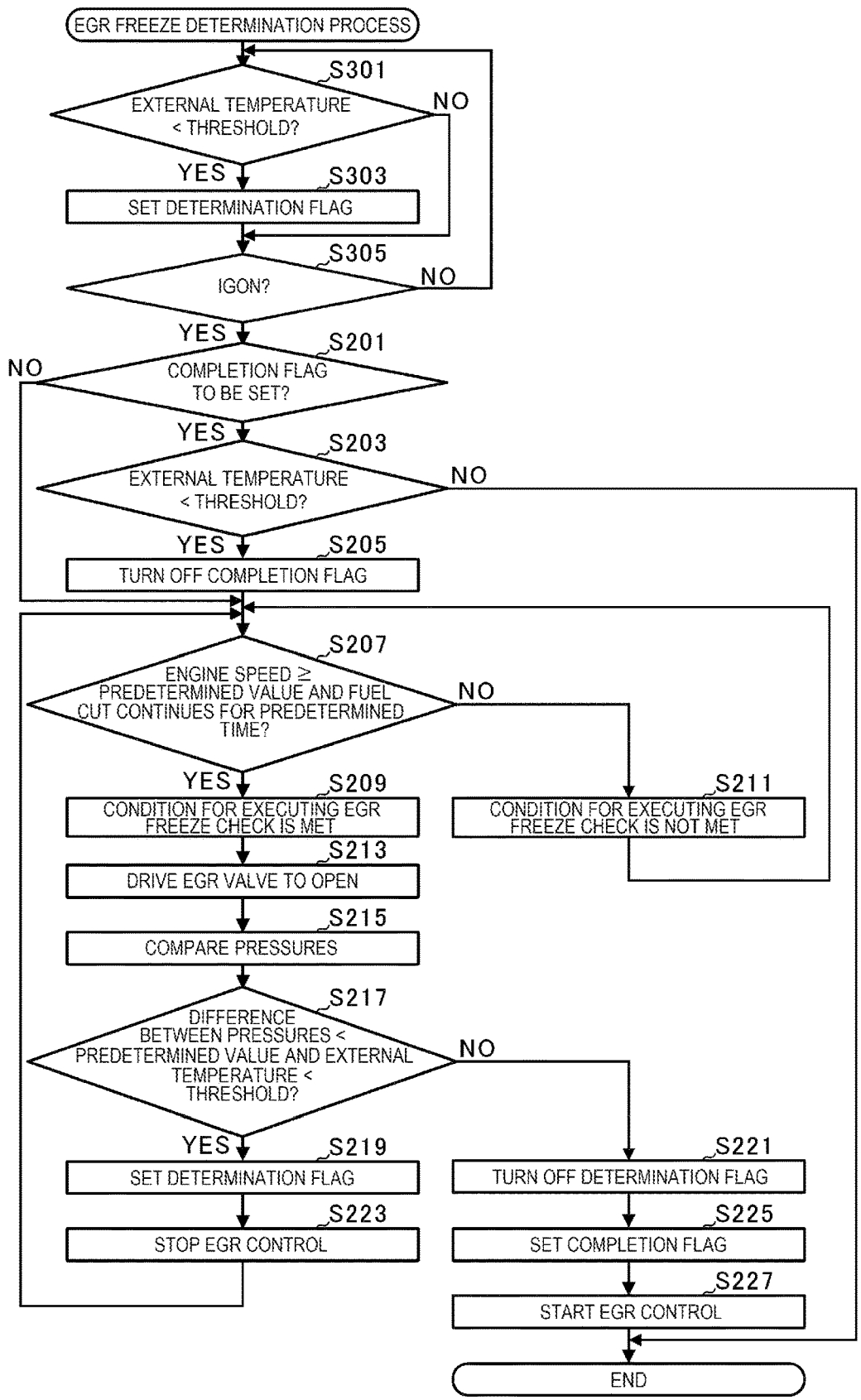
FIG. 3 is a flowchart illustrating an EGR freeze determination process in a modification.

FIG. 3 is a flowchart illustrating an EGR freeze determination process in a modification. In FIG. 3, contents the same as those in the abovementioned embodiment are denoted by the same reference signs, and descriptions thereof will be omitted. As illustrated in FIG. 3, the external temperature determination unit 504 acquires an external temperature after the ignition switch 458 is turned off (hereinafter, referred to as after IGOFF), and determines whether the external temperature is less than a threshold (for example, 0° C.) (S301). If the external temperature is less than the threshold, the freeze determination unit 510 determines that the EGR valve 406 is frozen, and sets the determination flag (S303). The external temperature determination unit 504 determines whether the ignition switch 458 has been switched from an OFF state to an ON state (hereinafter, referred to as IGON) (S305).

The external temperature determination unit 504 repeatedly executes the process at S301 until the IGON is obtained, executes the process at S303 if the external temperature is less than the threshold, and executes the process at S305 if the external temperature equal to or higher than the threshold. In the present modification, during a period from IGOFF to IGON, the external temperature determination unit 504 acquires an external temperature for every predetermined time (for example, every one hour), and determines whether the external temperature is less than the threshold. Further, if the minimum value of the external temperature is less than the threshold, the freeze determination unit 510 sets the determination flag. Accordingly, the freeze of the EGR valve 406 can be detected before the engine starts. Therefore, when there is a possibility that the EGR valve 406 is frozen, it is possible to stop the EGR control immediately after the engine has started, and thus reliably prevent knock.

The embodiments of the disclosure have been described above with reference to the accompanying drawings. It is needless to say that the disclosure is not limited to such embodiments. It will be apparent to those skilled in the art that various changes and modifications may be conceived within the scope of the claims, and it is understood that such changes and modifications also fall within the technical scope of the disclosure.

In the abovementioned embodiment and modification, the examples in which the ECU 500 has a function of the flag controller 514 have been described. However, the flag controller 514 may not be provided. The ECU 500 may have no function of the flag controller 514.

The ECU 500 including the drive controller 502, the external temperature determination unit 504, the EGR valve driver 506, the pressure comparison unit 508, the freeze determination unit 510, the EGR controller 512, and the flag controller 514 in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 500 including the drive controller 502, the external temperature determination unit 504, the EGR valve driver 506, the pressure comparison unit 508, the freeze determination unit 510, the EGR controller 512, and the flag controller 514 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM.

The ASIC is an integrated circuit (IC) customized to perform, and the FPGA is an integrated circuit designed to be configured after manufacturing in order to perform, all or a part of the functions of the ECU 500 including the drive controller 502, the external temperature determination unit 504, the EGR valve driver 506, the pressure comparison unit 508, the freeze determination unit 510, the EGR controller 512, and the flag controller 514 illustrated in FIG. 1.

The invention claimed is:

1. An EGR device to be applied to a vehicle, the EGR device comprising:
    a valve driver configured to drive an EGR valve to open, when fuel cut has been continued for a predetermined time in a state where an engine speed of an engine of the vehicle is equal to or higher than a predetermined rotational speed;
    a pressure comparison unit configured to compare a pre-driving pressure of an intake pipe of the engine before the EGR valve is driven with a post-driving pressure of the intake pipe after the EGR valve has been driven;
    a freeze determination unit configured to set a determination flag indicating that the EGR valve is frozen when a difference between the pre-driving pressure and the post-driving pressure is less than a predetermined value and an external temperature is less than a threshold;
    an EGR controller configured to, when the determination flag has been set, set a control state of the EGR valve to a closed state and stop EGR control; and
    an external temperature determination unit configured to determine whether the external temperature is less than the threshold for every predetermined time after an ignition switch of the vehicle is turned off,
    wherein the freeze determination unit sets the determination flag when the external temperature is less than the threshold after the ignition switch is turned off.

2. The EGR device according to claim 1, further comprising:
    a flag controller, wherein
    the EGR controller is configured to turn off the determination flag when the difference between the pre-driving pressure and the post-driving pressure is equal to or greater than the predetermined value,
    the flag controller is configured to
    set a completion flag indicating that an EGR freeze determination has been completed when the freeze determination unit turns off the determination flag, and
    turn off the completion flag when the external temperature becomes less than the threshold in a state where the completion flag has been set, and
    the valve driver is configured to
    forcedly drive the EGR valve for a freeze determination when the completion flag is turned off, and
    stop forcedly-driving the EGR valve for the freeze determination when the completion flag is set.

3. An EGR device to be applied to a vehicle, the EGR device comprising circuitry configured to:
    drive an EGR valve to open, when fuel cut has been continued for a predetermined time in a state where an engine speed of an engine of the vehicle is equal to or higher than a predetermined rotational speed,
    compare a pre-driving pressure of an intake pipe of the engine before the EGR valve is driven with a post-driving pressure of the intake pipe after the EGR valve has been driven, set a determination flag indicating that the EGR valve is frozen when a difference between the pre-driving pressure and the post-driving pressure is less than a predetermined value and an external temperature is less than a threshold, set, when the determination flag has been set, a control state of the EGR valve to a closed state and stop the EGR control, determine whether the external temperature is less than the threshold for every predetermined time after an ignition switch of the vehicle is turned off, and set the determination flag when the external temperature is less than the threshold after the ignition switch is turned off.

* * * * *